US008055627B2

(12) United States Patent
Prahlad et al.

(10) Patent No.: US 8,055,627 B2
(45) Date of Patent: *Nov. 8, 2011

(54) SYSTEM AND METHOD FOR ARCHIVING OBJECTS IN AN INFORMATION STORE

(75) Inventors: Anand Prahlad, East Brunswick, NJ (US); Andreas May, Marlboro, NJ (US); Zhao Wang, Piscataway, NJ (US); Randy Demeno, Staten Island, NY (US); Tinku Iyer, Mississauga (CA)

(73) Assignee: CommVault Systems, Inc., Oceanport, NJ (US)

( * ) Notice: Subject to any disclaimer, the term of this patent is extended or adjusted under 35 U.S.C. 154(b) by 498 days.

This patent is subject to a terminal disclaimer.

(21) Appl. No.: 12/252,897

(22) Filed: Oct. 16, 2008

(65) Prior Publication Data
US 2009/0164532 A1    Jun. 25, 2009

Related U.S. Application Data

(63) Continuation of application No. 11/497,546, filed on Jul. 31, 2006, now Pat. No. 7,472,142, which is a continuation of application No. 10/260,209, filed on Sep. 30, 2002, now Pat. No. 7,107,298.

(60) Provisional application No. 60/326,023, filed on Sep. 28, 2001.

(51) Int. Cl.
*G06F 7/00* (2006.01)
*G06F 17/00* (2006.01)
(52) U.S. Cl. ........................................................ 707/661
(58) Field of Classification Search .................. None
See application file for complete search history.

(56) References Cited

U.S. PATENT DOCUMENTS

| | | | |
|---|---|---|---|
| 4,686,620 A | 8/1987 | Ng | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |

(Continued)

FOREIGN PATENT DOCUMENTS

EP    0259912    3/1988

(Continued)

OTHER PUBLICATIONS

Armstead et al., "Implementation of a Campus-wide Distributed Mass Storage Service: The Dream vs. Reality," *IEEE*, 1995, pp. 190-199.

(Continued)

*Primary Examiner* — Uyen T. Le
(74) *Attorney, Agent, or Firm* — Perkins Coie LLP

(57) ABSTRACT

The invention relates generally to archiving data items in an information store. More particularly, the invention provides a computerized method for identifying, in a first information store, a first data item satisfying retention criteria; copying the first data item to a second information store; creating, in the first information store, a second data item containing a subset of the data of the first data item selected based on the data type of the first data item; and replacing the first data item, in the first information store, with the second data item.

19 Claims, 5 Drawing Sheets

U.S. PATENT DOCUMENTS

| | | |
|---|---|---|
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,564,037 A | 10/1996 | Lam |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 5,991,753 A | 11/1999 | Wilde |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,327,612 B1 | 12/2001 | Watanabe et al. |
| 6,328,766 B1 | 12/2001 | Long |
| 6,330,570 B1 | 12/2001 | Crighton et al. |
| 6,330,642 B1 | 12/2001 | Carteau |
| 6,343,324 B1 | 1/2002 | Hubis et al. |
| 6,345,288 B1 | 2/2002 | Reed et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,658,526 B2 | 12/2003 | Nguyen et al. |
| 6,995,675 B2 | 2/2006 | Curkendall et al. |
| 7,107,298 B2 | 9/2006 | Prahlad et al. |
| 7,424,543 B2 | 9/2008 | Rice, III |
| 2007/0033237 A1 | 2/2007 | Prahlad et al. |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| EP | 1035690 | 9/2000 |
| JP | 07-046271 A | 2/1995 |
| JP | 2000035969 | 2/2000 |
| WO | WO-95/13580 | 5/1995 |
| WO | WO-99/12098 | 3/1999 |
| WO | WO-00/58865 | 10/2000 |
| WO | WO-01/16693 | 3/2001 |

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System,"*Operating Systems Review SIGOPS*, vol. 25, No. 5, New York, US, pp. 1-15 (May 1991).

Official Inquiry for Japanese Application No. 2003-531358, Mail Date Apr. 6, 2010, 7 pages.

SYSTEM AND METHOD FOR ARCHIVING OBJECTS IN AN INFORMATION STORE

CROSS-REFERENCE TO RELATED APPLICATION(S)

Priority Claim

This application is a continuation of U.S. application Ser. No. 11/497,546, filed Jul. 31, 2006, now U.S. Pat. No. 7,472,142, which is a continuation of U.S. application Ser. No. 10/260,209, filed Sep. 30, 2002, now U.S. Pat. No. 7,107,298, which claims priority from U.S. Provisional Patent Application No. 60/326,023, entitled "APPLICATION SPECIFIC OBJECT ARCHIVING AND RETRIEVAL SYSTEM", filed Sep. 28, 2001, each of which is herein incorporated by reference in its entirety.

RELATED APPLICATIONS

This application is related to the following pending applications:
  application Ser. No. 09/610,738, titled MODULAR BACKUP AND RETRIEVAL SYSTEM USED IN CONJUNCTION WITH A STORAGE AREA NETWORK, filed Jul. 6, 2000;
  application Ser. No. 09/609,977, titled MODULAR BACKUP AND RETRIEVAL SYSTEM WITH AN INTEGRATED STORAGE AREA FILING SYSTEM, filed Aug. 5, 2000;
  application Ser. No. 09/354,058, titled HIERARCHICAL BACKUP AND RETRIEVAL SYSTEM, filed Jul. 15, 1999;
  application Ser. No. 09/774,302, titled LOGICAL VIEW WITH GRANULAR ACCESS TO EXCHANGE DATA MANAGED BY A MODULAR DATA AND STORAGE MANAGEMENT SYSTEM, filed Jan. 30, 2001;
  application Ser. No. 09/876,289, titled APPLICATION SPECIFIC ROLLBACK IN A COMPUTER SYSTEM, filed Jun. 6, 2000;
  application Ser. No. 09/774,272, titled EMAIL ATTACHMENT MANAGEMENT IN A COMPUTER SYSTEM, filed Jan. 30, 2001;
  application Ser. No. 09/882,438, titled STORAGE OF APPLICATION SPECIFIC PROFILES CORRELATION TO DOCUMENT VERSIONS, filed Jun. 14, 2001; and
  application Ser. No. 60/411,202, Titled COMBINED STREAM AUXILIARY COPY SYSTEM AND METHOD, filed Sep. 16, 2002;
each of which is hereby incorporated by reference in this application in its entirety.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND

The invention disclosed herein relates generally to object archiving and retrieval in computer systems.

Electronic mail (e-mail) has increasingly become a common and accepted manner of exchanging messages for individuals both at home and in the workplace. Indeed, some e-mail users send and receive hundreds or even thousands of messages each day. Managing this large volume of message traffic, however, has become a problem for both individual users and network administrators.

When messages are sent and received by a mail application, they are stored for review in folders which are typically part of a file commonly referred to as an e-mail information store ("IS") that is designated to hold e-mail stored on the user's local computer or on a network storage device. Other types of applications such as directory services applications also have information stores which contain data specific to particular applications.

Over time, the IS typically grows in size as the user continues to receive and send more e-mail. This constantly increasing growth is problematic. Unless steps are periodically taken to reduce its size, the IS will eventually grow so large that it will use considerable amounts of disk space and also require excessive system resources to access its information. To keep the size of the IS under control and optimize system performance, administrators and users of e-mail systems have had to either delete or archive old or unwanted messages to release disk space. Both of these methods have serious drawbacks.

One problem associated with archiving old messages is that the archived messages are normally stored on the user's workstation in file formats such as .PST files which are difficult to manage. All references to individual messages archived to .PST files no longer appear in the inbox and these individual messages are no longer readily accessible by browsing the e-mail client GUI. In order to review individual archived messages, users must know which archive contains their message and must open the individual archive containing the message before being able to access the message contents. This process is often time-consuming with users frequently resorting to trial-and-error methods of opening archives to locate desired messages.

Deleting old or unwanted messages is an even less desirable solution than archiving such messages. While archive files are difficult to manage and to retrieve messages from, deleting old or unwanted messages makes management and retrieval even more difficult and frequently impossible. If the user has performed a system backup prior to deleting such messages, retrieval is sometimes still possible, but the user must then restore the entire the entire system from the backup to retrieve the messages. In the worst case, the messages are simply lost forever when they are deleted.

Further, even in a networked environment with a central e-mail sever such as, for example, a Microsoft Exchange Server, which contains a central IS, the normal backup process will also not directly help cut down the size of the IS. Backing up the IS will still leave all of the messages in the IS unless the individual users delete or archive messages at their workstations.

There is thus a need for a system which permits users to easily manage archiving and retrieving e-mail messages.

In addition, similar problems relating to archiving of old or unwanted objects exist in other directory services applications such as Microsoft's Active Directory, the University of Michigan's LDAP Servers, Lotus Notes, Microsoft's Sharepoint Portal, and other similar applications. In each of these applications, there exists a database similar to the Exchange IS which is constantly growing over time. System administrators must decide how much data in these databases is actually needed, how much should be archived, etc. One problem with archiving an entire directory services application database is that on restore, the entire database generally needs to be shut down even if only a small portion of the database needs to be restored. More single file restores are done than full system restores which results in inefficient use of system resources among other problems. There is thus also a need for a system which permits users to easily manage archiving and retrieving directory services and other similar application objects.

SUMMARY

The present invention addresses the problems discussed above with the management of archiving and retrieving application specific archiving and retrieval.

In accordance with some aspects of the present invention, computerized methods are provided for archiving data, the methods comprising identifying, in a first information store, a first data item satisfying a retention criterion; copying the first data item from the first information store to a second information store; creating, in the first information store, a second data item containing a subset of the data of the first data item selected based on the data type of the first data item; and replacing the first data item, in the first information store, with the second data item. In some embodiments, the first data item may comprise an electronic mail message, an attachment to an electronic mail message, a directory services entry, or other data objects.

The retention criteria is a property or characteristic of the first data item used by the invention to select the first data item for archiving and other purposes. In some embodiments, the retention criterion comprises a first creation date and identifying the first data item comprises comparing a first creation date of the first data item to the creation date specified as the retention criteria. In some embodiments, the retention criterion comprises a last accessed date and identifying the first data item comprises comparing a last accessed date of the first data item to the last accessed date specified as the retention criteria. In some embodiments, the retention criterion comprises an item size and identifying the first data item comprises comparing an item size of the first data item to the item size specified as the retention criteria.

In some embodiments, the first information store may comprise an electronic mail information store, a directory services information store, or other type of information store. In some embodiments, the second information store is a secondary storage device. In some embodiments, the second data item contains index information identifying a location of the first data item in the second information store.

In some embodiments, the second data item may comprise an electronic mail message, a directory services entry, or other type of data object. In some embodiments, the second data item contains header fields of the first data item which may include, for example, in the case of an electronic mail message, a sender field, a recipient field, a subject field, a date field, and a time field. In some embodiments, the second data item contains a subset of the message body of the first data item. In some embodiments, the second data item contains a message body specified by a user. In some embodiments, replacing the first data item comprises deleting the first data item from the first information store.

In one embodiment, the invention provides a system for archiving data, the system comprising a first information store containing one or more data items; a second information store; and a computer, connectable to the first information store and the second information store; wherein the computer is programmed to identify, in the first information store, a first data item satisfying a retention criteria; to copy the first data item to the second information store; to create, in the first information store, a second data item containing a subset of the data of the first data item selected based on the data type of the first data item; and to replace the first data item from the first information store. In some embodiments, the computer is programmed to identify an electronic mail message, an attachment to an electronic mail message, a directory services entry, and combinations thereof. In some embodiments, the computer is programmed to replace the first data item from the first information store by deleting the first data item.

In one embodiment, the invention provides a computer usable medium storing program code which, when executed on a computerized device, causes the computerized device to execute a computerized method for archiving data, the method comprising identifying, in a first information store, a first data item satisfying a retention criterion; copying the first data item from the first information store to a second information store; creating, in the first information store, a second data item containing a subset of the data of the first data item selected based on the data type of the first data item; and replacing the first data item, in the first information store, with the second data item.

In one embodiment, the invention provides a system for archiving data comprising a plurality of application-specific data agents each configured to coordinate archiving of first data items used in a particular software application; and a plurality of application-specific stubbing modules each functionally integrated with a corresponding application-specific data agent, each stubbing module being configured to replace a first data item used in the corresponding software application with a second data item used in the corresponding software application and representing a subset of the first data item.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

Figure 1:
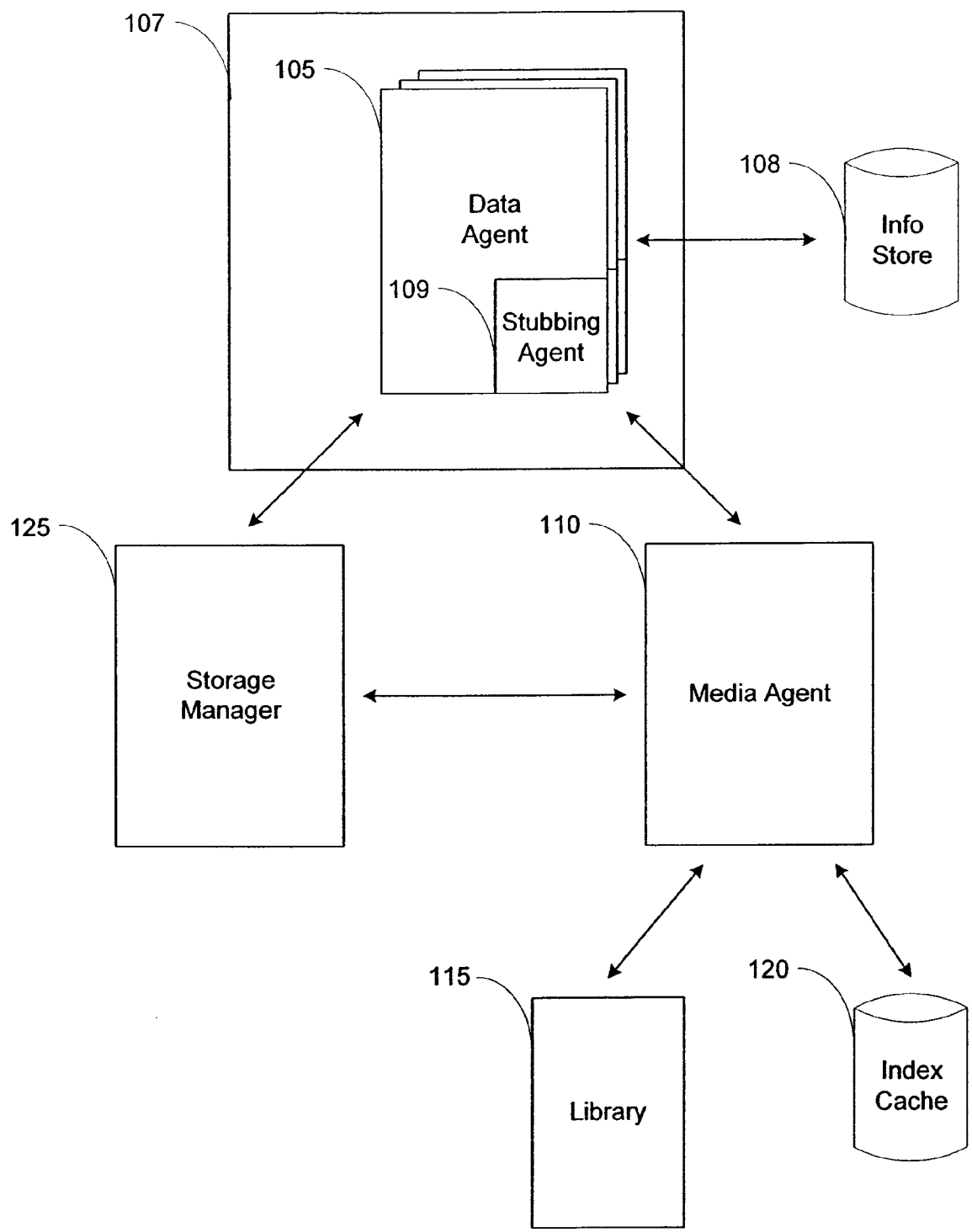
FIG. 1 is block diagram of a network architecture for a system to archive and retrieve application specific objects according to embodiments of the invention.

Embodiments of methods and systems according to the present invention are described through references to FIGS. 1 though 5. A network architecture for a system to archive and retrieve application specific objects in accordance with embodiments of the present invention is depicted in FIG. 1. As shown, the system includes a storage manager 125 and one or more of the following: a data agent 105, a client computer 107, a first information store 108, a stubbing module 109, a media agent 110, a secondary storage library 115, and an index cache 120. The system and elements thereof are exemplary of a three-tier backup system such as the CommVault Galaxy backup system, available from CommVault Systems, Inc. of Oceanport, N.J., and further described in application Ser. No. 09/610,738 which is incorporated herein by reference in its entirety.

A data agent 105 is a software module that is generally responsible for archiving, migrating, and recovering data of a client computer 107. Each client computer 107 has at least one data agent 105 and the system can support many client computers 107. The system provides a plurality of data agents 105 each of which is intended to backup, migrate, and recover data associated with a different application. For example, different individual data agents 105 maybe designed to handle Microsoft Exchange data, Lotus Notes data, Microsoft Windows 2000 file system data, Microsoft Active Directory Objects data, and other types of data known in the art. If a client computer 107 has two or more types of data, one data agent 105 is required for each data type to archive, migrate, and restore the client computer 107 data. For example, to backup, migrate, and restore all of the data on a Microsoft Exchange 2000 server, the client computer 107 would use one Microsoft Exchange 2000 Mailbox data agent 105 to backup the Exchange 2000 mailboxes, one Microsoft Exchange 2000 Database data agent 105 to backup the Exchange 2000 databases, one Microsoft Exchange 2000 Public Folder data agent 105 to backup the Exchange 2000 Public Folders, and one Microsoft Windows 2000 File System data agent 105 to backup the client computer's 107 file system. These data agents 105 are addressed as four separate data agents 105 by the system even though they reside on the same client computer 107.

The data stubbing module 109 is a component of the media agent that performs stubbing operations on data items as further described herein.

A media agent 110 conducts data between the client computer 107 and one or more storage libraries 115 such as a tape library or other storage device. The media agent 110 is communicatively coupled with and controls the storage library 115. For example, the media agent 110 might instruct the storage library 115 to use a robotic arm or other means to load or eject a media cartridge, and to archive, migrate, or restore application specific data. The media agent 110 generally communicates with the storage library 115 via a local bus such as a SCSI adaptor. In some embodiments, the storage library 115 is communicatively coupled to the data agent 110 via a Storage Area Network ("SAN").

Each media agent 110 maintains an index cache 120 which stores index data the system generates during backup, migration, and restore storage operations as further described herein. For example, storage operations for Microsoft Exchange data generate index data. Index data is useful because it provides the system with an efficient mechanism for locating user files for recovery operations. Although this index data is generally stored with the data backed up to the storage library 115, the media agent 110 that controls the storage operation also writes an additional copy of the index data to its index cache 120. The data in the index cache 120 is thus readily available to the system for use in storage operations and other activities without having to be first retrieved from the storage library 115.

Each index cache 120 typically resides on the corresponding media agent's 110 hard disk or other fixed storage device. Like any cache, the index cache 120 has finite capacity and the amount of index data that can be maintained directly corresponds to the size of that portion of the disk that is allocated to the index cache 120. In one embodiment, the system manages the index cache 120 on a least recently used ("LRU") basis as known in the art. When the capacity of the index cache 120 is reached, the system overwrites those files in the index cache 120 that have been least recently accessed with the new index data. In some embodiments, before data in the index cache 120 is overwritten, the data is copied to the index cache 120 copy in the storage library 115. If a recovery operation requires data that is no longer stored in the index cache 120 such as in the case of a cache miss, the system recovers the index data from the index cache 120 copy stored in the storage library 120.

The storage manager 125 is a software module or application that coordinates and controls the system. The storage manager 125 communicates with all elements of the system including media agents 110, client computers 107, and data agents 105 to initiate and manage system backups, migrations, and recoveries.

In some embodiments, components of the system may reside and execute on the same computer. In some embodiments, a client computer 107 component such as a data agent 105, a media agent 110, or a storage manager 125 coordinates and directs local archiving, migration, and retrieval application functions as further described in application Ser. No. 09/610,738. This client computer 107 component can function independently or together with other similar client computer 107 components.

Figure 2:
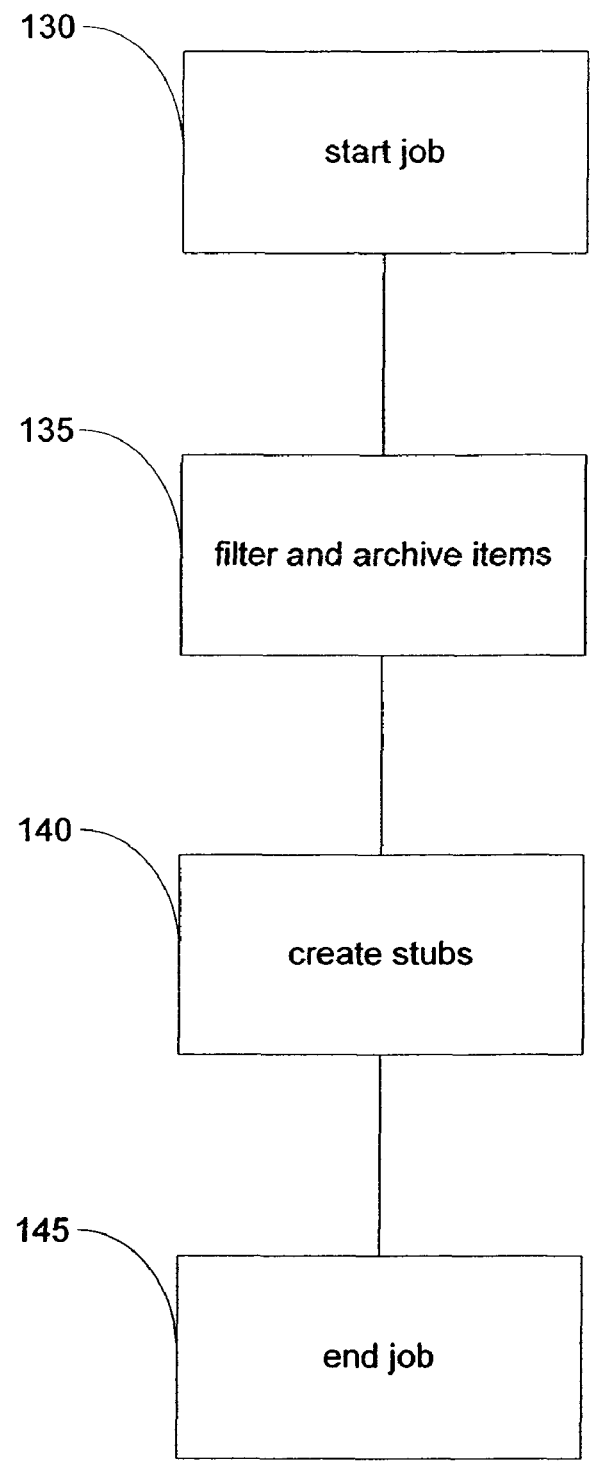
FIG. 2 is high-level flow chart of a method to archive application specific objects according to embodiments of the present invention.

FIG. 2 presents high-level flow chart of a method to archive application specific objects in accordance with embodiments of the present invention. An archive job automatically starts, step 130, according to a pre-defined schedule or as manually directed by a user. In some embodiments, the storage manager 125 instructs the media agent 110 to begin an archive job and the media agent 110 then instructs the data agent 105 to commence an archive process. In other embodiments, the media agent 110 directly instructs the data agent 105 to commence an archive process without instructions from the storage manager 125.

The archive process filters and archives those messages, objects, or other data items in a first information store 108 according to specified retention criteria, step 135. In some embodiments, the retention criteria may be input directly by a user when the archive job is started. In other embodiments, the retention criteria may be pre-defined or calculated automatically according to user preferences or other information and the archive job proceeds autonomously. Those messages, objects, or other data items that fulfill the specified retention criteria are copied from the first information store 108 to a second information store. In some embodiments, the second information store is located on secondary storage media such as a storage library 115.

A stubbing process creates a stub for and deletes each message in the first information store 108 that was copied to the second information store, step 140. As used herein, stubs are data objects that replace messages, objects, and other data items in the first information store 108 that were copied to the second information store. Copying the messages to the second information store frees storage space in the first information store 108. Stubs that replace the copied messages generally require less storage space and indicate which items were copied and deleted from the first information store 108. Stubs also facilitate retrieval of messages that were copied to the second information store.

When all items in the first information store 108 have been archived and stubbed or when directed by a user, the job ends, step 145.

Figure 3:
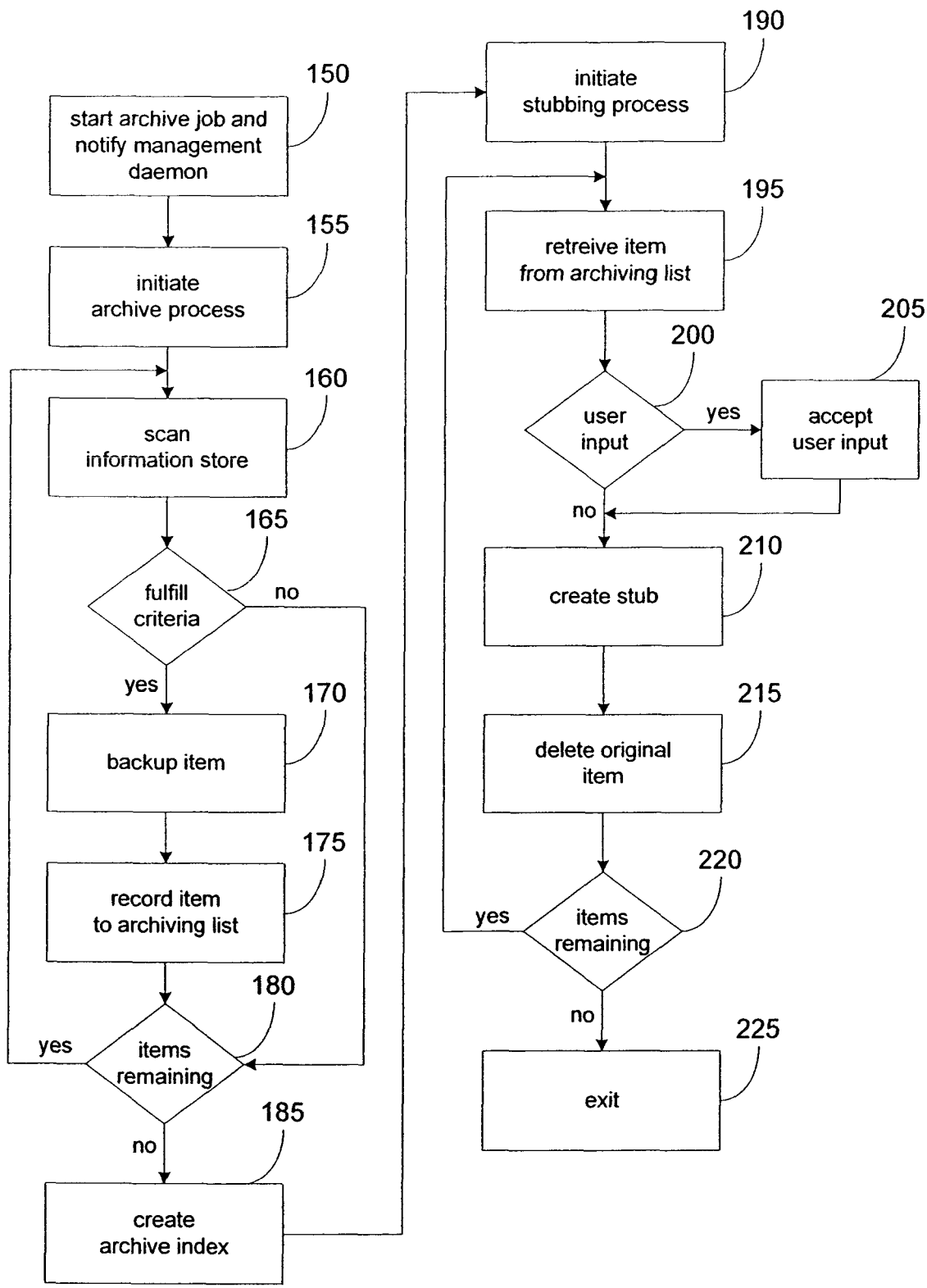
FIG. 3 is a detailed flow chart of a method to archive application specific objects according to embodiments of the present invention.

FIG. 3 presents detailed flow chart of a method to archive application specific objects in accordance with embodiments of the present invention. A job manager starts an archiving job beginning with an archiving phase and notifies an archive management daemon on the client computer 107, step 150. The job manager is a software process that is generally a part of the storage manager 125, but in some embodiments the job manager may also be part of the media agent 110, the data agent 105, or any combination thereof. In some embodiments, the system starts with the archiving phase to ensure that messages, objects, or other data items are only stubbed after they are backed-up to secondary storage. Those skilled in the art will recognize that multiple archiving jobs could be run at one time.

As previously described herein, archive jobs can either be started manually as directed by a user or automatically as a scheduled system management task. In some embodiments, archive jobs may take place according to schedule policies as further described in application Ser. No. 09/882,438 which is incorporated herein by reference in its entirety. For example, a schedule policy may indicate that archive jobs should take place on a specified information store once per day at a particular hour or at other designated times. In some embodiments, the archiving process and stubbing process can also be scheduled at off-peak times to reduce the load to system resources.

The archive management daemon initiates an archiving process of the data agent 105, step 155, which archives messages, objects, or other data items in a first information store 108 according to specified retention criteria.

The archiving process scans an item in the first information store 108 to determine whether the item fulfills the retention criteria, step 160. For example, in an email information store, the archiving process scans the mailboxes in the IS 108 to find candidate messages or objects meeting either the default retention criteria, such as the retention criteria specified in a storage policy, or the retention criteria customized by the user.

As previously described, retention criteria define archiving rules for the archiving process to control the content of stubs, which messages, objects, or other data items get archived, the retention time for stubs and archived messages, objects, or other data items, and other similar filtration criteria. In one embodiment, messages, objects, and other data items are copied to secondary storage according to parameters such as job ID, times, etc. In other embodiments, retention criteria specify additional options to indicate whether a stub should be left behind or not, whether the entire message or object or just the attachment should be archived, and other similar choices. In some embodiments, retention criteria specify a mailbox size threshold and exclusion filter for mailbox(es) or folder(s), so that only mailboxes whose size exceed the threshold and are not in the filter list will be scanned. In some embodiments, retention criteria also specify rules based on message creation time, modification time, size, or attachment(s) to further control the message selection criteria. For example, messages in the IS 108 that satisfy certain retention criteria such as age, size, size of attachments, amount of disk space left, size of mailbox, etc. are archived to secondary storage 115.

Since stubs are usually new small messages or objects with no attachments, they can be difficult to remove from a users mailbox. To facilitate stub management among other things, retention criteria also define the lifetime of a stub in some embodiments. After a stub expires past its lifetime, the next archiving job will either delete the stub from the first information store 108 or archive the stub to secondary storage such as a storage library 115.

The size of index cache 120 may grow over time and in some embodiments, archive pruning-related retention criteria specifies that data should be pruned or deleted in the first information store 108 and also in the index cache 120. In some embodiments, retention criteria may also specify whether archived messages, objects, and other data items in secondary storage 115 should be pruned after additional time has passed or at any desired point.

In some embodiments, retention criteria specifies that there should be no orphan stubs left in the IS 108. In one embodiment, this goal among others is achieved by using retention times, such that stubs always expire before their related messages, objects, or other data items archived in secondary storage 115. In other embodiments, retention criteria specifies that items archived in secondary storage 115 are not pruned if a stub still exists in the first information store 108. In an alternate embodiment, archive pruning of secondary storage 115 items produces a pruned list stored in the index cache 115 or other information store and the system uses this list to then remove the related stubs remaining in the first information store 108. In some embodiments, however, retention criteria may permit messages archived in secondary storage to be pruned even if a related stub still exists in the first information store 108.

If the item scanned fulfills the retention criteria, step 165, the archiving process writes a copy of the message, object, or other data item to secondary storage 115, step 170, as further described in application Ser. Nos. 09/610,738 and 09/609,977 which are incorporated herein by reference in their entirety. To make the restore process faster and to achieve other desirable goals, messages, objects, and other data items can first be archived on a magnetic library. Later these items can be moved to tape or some other storage media for long-term storage. In one embodiment, data may be moved from a magnetic library to tape or some other secondary storage media using auxiliary copy to further conserve system resources, and as described in Application No. 60/411,202, COMBINED STREAM AUXILIARY COPY SYSTEM AND METHOD, filed Sep. 16, 2002, which is incorporated herein by reference in its entirety.

Identifying characteristics and other information about the item copied to secondary storage 115 are recorded to an archiving list stored in a local information store of the data agent 105, step 175. During the archiving phase, a record detailing information about every item successfully copied from the first information store 108 to secondary storage 115 will be stored in the archiving list which serves as input and is used during the stubbing phase as further described herein. The content of items in the archiving list include information for the later stubbing phase and restore process to locate the original archived messages, objects, or other data items. Examples of such information include mailbox name, folder ID, message ID, and link information to the item's secondary storage location. An example of such link information is a Universal Naming Convention ("UNC") path to the item's index entry in a Galaxy file system.

The system determines whether additional items remain in the first information store 108 to be scanned against the retention criteria, step 180. If additional items remain to be scanned, then control returns to step 160, and the process repeats. Otherwise, the archiving process terminates and the job manager then starts the archiving index phase writing the archive information to the index cache 115 on a media agent 110 or other component, step 185, as further described in application Ser. No. 09/610,738 which is hereby incorporated by reference in its entirety.

When the archiving index phase is complete, the media agent notifies the job manager which then initiates a stubbing process, step 190. The stubbing process retrieves the archiving list of messages, objects, or other data items created during the archiving process to use as input during the stubbing phase and sequentially processes each item on the archiving list, step 195. While the stubbing process could query the media agent 110 containing the index cache 115 created during the archiving index phase, this option is less desirable due to the network and processor resources required. A more desirable method, as described herein, combines archiving and stubbing into a single job in which the stubbing phase only starts after the archiving phase is successfully completed. In one embodiment, the stubbing phase processes items on the archiving list based on application ID, job status, and other criteria.

In some embodiments, before a stub is created, the system prompts for, step 200, and accepts, step 205, user input of text and other information to display or otherwise associate with a stub.

For each item on the archiving list, the stubbing process then creates a new "stub" message, object, or other data item in the first information store 108, step 210. Each new message has the same data structure as the original message, except the body field of the message is replaced with explanation text or other information indicating that the message is a stub, and a path linking to the archived message.

New stubs are generally created according to stub configuration options specified in the storage policy associated with the first information store 108. Stub configuration options include stub with no body or stub with full body, but no attachment, etc. The subject of the stub can be changed to incorporate a tag or other parsable identifier such as "<archived> original subject" so that subsequent archive operations can identify the stub. In some embodiments, there are also named properties in stubs. In some embodiments, stubs contain an ID and an archive time to assist backup systems such as Galaxy with stub management.

After each stub is successfully created, the stubbing process deletes the original message, step 215, and determines whether there are additional items to process on the archiving list, step 220. If additional items remain to be processed, control returns to step 195. Otherwise, once all messages, objects, and other data items on the archiving list have been processed, the stubbing process returns control to the job manager and the archiving job terminates, step 225.

Figure 4:
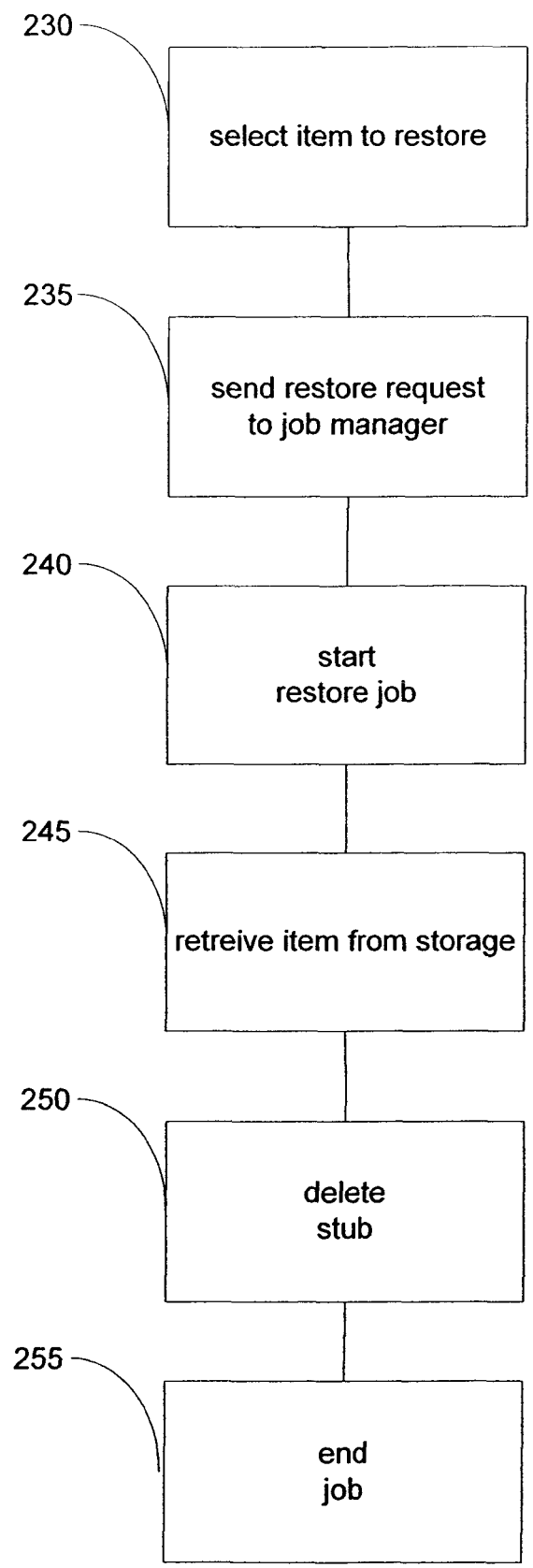
FIG. 4 is a flow chart of a method to restore application specific objects according to embodiments of the present invention.

FIG. 4 presents a flow chart of a method to restore application specific objects according to embodiments of the present invention. The message, object, or other data item to restore is selected, step 230. The item may be selected automatically by the system according to predefined restore criteria stored in the index cache 115, in a storage policy, or in another information store. The system also accepts user input to manually select the item to restore.

Figure 5:
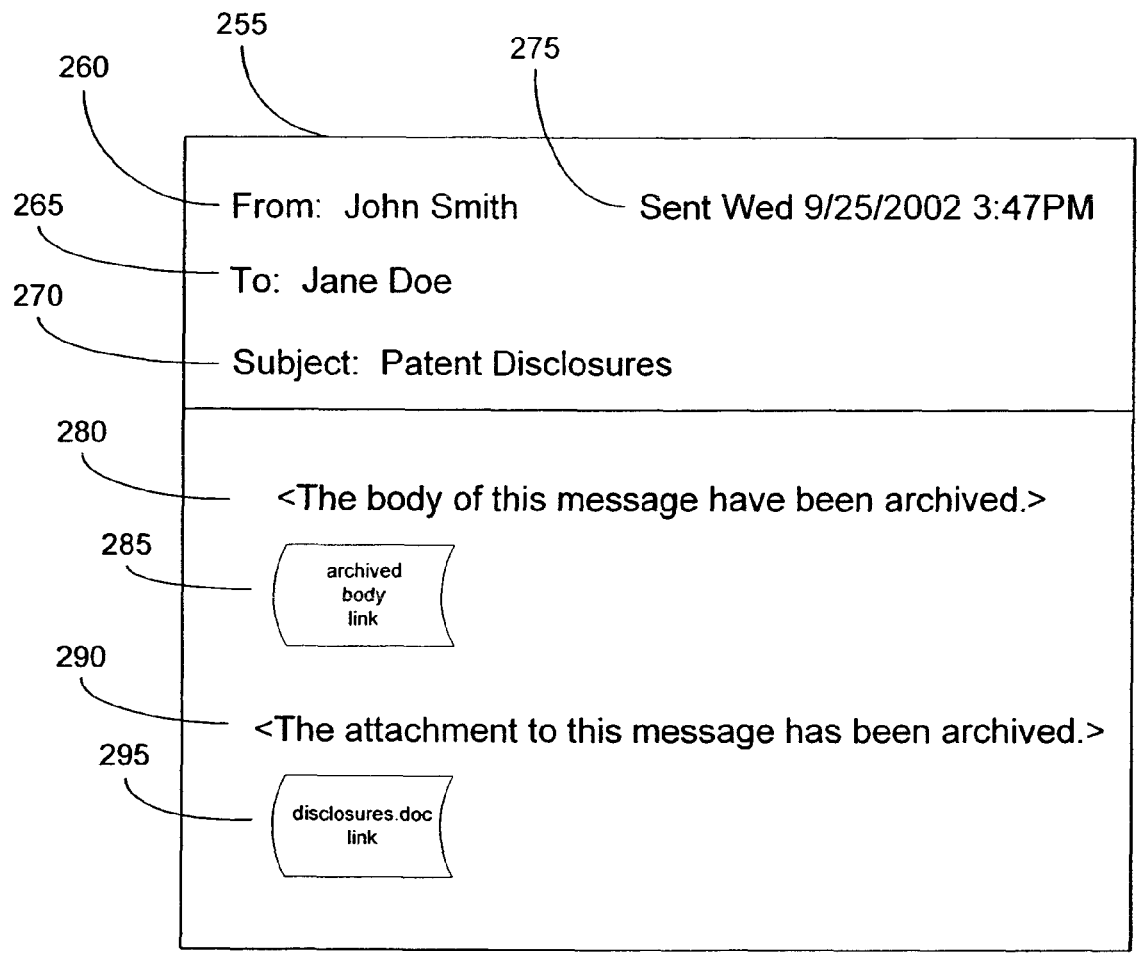
FIG. 5 is an exemplary screen display of an e-mail message stub from a system to archive and retrieve application specific objects according to embodiments of the present invention.

Turning to FIG. 5, for example, a sample screen display shows an e-mail message stub from a system to archive and retrieve application specific objects according to embodiments of the present invention. As shown, the stub includes many of the header fields of the original archived message including the sender 260, the recipient 265, the subject 270, and the time/date 275. The stub also includes a message 280 indicating that the body of the original message has been archived, a link 285 to the archived message body, a message 290 indicating that an attachment to the original message has been archived, and a link 295 to the archived attachment.

In one embodiment, items archived in secondary storage, such as the message body, can be restored by manually clicking on the UNC link 285 or other identifying path in the item's related stub. The stub message ID is encoded within the link 285. The media agent 210 or the data agent 205 detects the click, parses the message ID, and passes the ID as a parameter to the restore process, as further described herein.

If an archived e-mail message's corresponding stub is still in a mailbox or other browsable first information store 108, a user can search on the stubs' fields copied from the archived e-mail message including the sender 260, recipient 265, subject 270, time/date 275, and other identifying criteria to find the corresponding stub. In some embodiments, stubs with full bodies can also be located via full-text (index) searching functions of a mail server or other file system.

Sometimes, stubs will no longer be accessible via the first information store 108. For example, stubs may have been pruned or otherwise deleted. In another embodiment, the archived message can be selected via the archived message's index entry in a secondary storage file system such as in the Galaxy system. For example, if the user wants to restore an archived e-mail message whose corresponding stub has been pruned from the first information store 108 mailbox, the user can still restore the archived e-mail via a backup system console browser such as the Galaxy console browser.

As further described in application Ser. Nos. 09/610,738 and 09/609,977 which are incorporated herein by reference in their entirety, selecting an item to restore triggers the media agent 210 mapped storage installable file system, and the media agent 210 sends a restore request to a job manager process on the media agent, step 235. The job manager on the media agent 210 starts a restore job using the information contained in the request and notifies a job manager process of the data agent 205, step 240. The job manager process of the data agent 205 creates a restore process which retrieves the archived message from the secondary storage library 115 returning it to the first information store 108, step 245. After the archived item is restored from secondary storage 115 and copied to the first information store 108, the item's corresponding stub is deleted from the first information store 108, step 250, and the job ends, step 255.

In some embodiments, users are prevented from modifying stubs since the restore process depends on special information contained in each stub to identify it as a stub and to restore the original message.

In one embodiment, if users are moved to another mail server having a different information store than the first information store 108, the system first restores all the stubbed messages, objects, and other data items back to the user's mailbox in the first information store 108, and then deletes all the stubs before the administrator is permitted to move the user. In some embodiments, this is accomplished as an integrated part of the system or as a separate process to scan the mailbox in the first information store 108, find all the stubs, pass the links to the media agent 119 to start a restore job, and then delete the stubs. In some embodiments, stubs contain application type, backup management system console information such as CommVault CommServer information, and other information which ensures compatibility and continued functionality of the invention if a user updates their mail server.

While the system has frequently been described above in the context of electronic mail object archiving, the system also archives and restores general directory services client objects for each entry that exists in a service such as Microsoft's Active Directory, the University of Michigan's LDAP Servers, Lotus Notes, Microsoft's Sharepoint Portal, and other similar applications. Attributes and properties of each archived service entry are retained in the corresponding stub. Client operations are performed using an interface such as the Windows LDAP API, which can interface with Active Directory, as well as any other LDAP compliant directory service. Similarly, the directory services client looks and behaves very much like an e-mail file system agent from a GUI standpoint with backup sets and sub-clients where default sub-clients backup the entire directory service and new sub-clients are defined to limit the scope of the backup. Filters specify retention criteria to archive certain branches of the directory tree, certain entries, and certain attributes. Each entry is stored in a separate file that adheres to the interface format, such as the LDIF (LDAP Data Interchange Format) format, which is an RFC standard format for listing the attributes of an entry.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A computer-implemented method for restoring archived data, the method comprising:
    selecting an indicator, or receiving selection of the indicator, wherein the indictor is associated with a data item,
        wherein the data item is stored in a secondary storage device,
        wherein the indicator is stored in a primary storage device, wherein the primary and secondary storage devices are coupled via a network,
        wherein the indicator includes an identifying path to the data item, and
        wherein the indicator includes a representative portion of the data item;
    based on the selected indicator, accessing the data item from the secondary storage device via the identifying path;
    copying the data item to the primary storage device; and
    removing, from the primary storage device, the indicator associated with the copied data item;
    wherein selecting the indicator includes selecting an electronic mail message having a header field of the data item, wherein the header field includes at least two of a sender field, a recipient field, a subject field, a time field, and a date field.

2. The method of claim 1 wherein selecting the indicator includes selecting the indicator associated with the data item in response to a manual user input,
    wherein the indicator is not modifiable by the user,
    wherein selecting the indicator includes accessing a Universal Naming Convention (UNC) link included in the indicator, and
    wherein accessing the UNC link includes parsing a tag or other parsable identifier encoded within the indicator, wherein the tag or other parsable identifier identifies the indicator.

3. The method of claim 1 wherein selecting the indicator includes selecting the indicator associated with the data item in response to a manual user input, and,
    wherein selecting the indicator includes accessing a Universal Naming Convention (UNC) link included in the indicator.

4. The method of claim 1 wherein selecting the indicator includes selecting a data object having a same data structure as the data item.

5. The method of claim 1 wherein selecting the indicator includes selecting an electronic mail message having a new message body that replaces a message body included within the data item, wherein the new message body is a subset of the message body of the data item.

6. The method of claim 1 wherein accessing the data item from the secondary storage device via the identifying path includes accessing at least one of an electronic message and an attachment to the electronic message, wherein the identifying path identifies a location of the data item in the secondary storage device.

7. A computer-implemented method for moving data items between servers, the method comprising:
    extracting data items stored in a secondary storage device associated with a first server;
    transferring the extracted data items into a primary storage device associated with the first server,
        wherein indicators associated with the data items stored in the secondary storage device are stored in the primary storage device,
        wherein the indicators include identifying paths to the data items and representative portions of the data items, and
        wherein the primary and secondary storage devices are coupled via a network;
    deleting the indicators from the primary storage device associated with the first server; and
    moving the data items from the primary storage device associated with the first server to a primary storage device associated with a second server.

8. The method of claim 7, further comprising:
    copying the data items from the primary storage device associated with the secondary server to a secondary storage device of the second server; and
    creating in the primary storage device associated with the second server further indicators that identify paths to the data items in the secondary storage device of the second server, wherein the further indicators include representative portions of the data items,
        wherein copying the data items includes copying directory services entries to the secondary storage device of the second server, wherein attributes and properties of the directory services entries are included in the further indicators stored in the primary storage device associated with the second server.

9. The method of claim 7, further comprising:
copying the data items from the primary storage device associated with the secondary server to a secondary storage device of the second server; and
wherein copying the data items from the primary storage of the second server to the secondary storage includes storing the directory services entries in separate files that adhere to an LDIF (LDAP Data Interchange Format) format.

10. The method of claim 7 wherein the data items are electronic mail messages for an electronic mail box for a user and wherein the transferring is done based on an age-based storage policy.

11. The method of claim 7, further comprising copying the data items from the primary storage device associated with the second server to the secondary storage device occurs in response to directory services entries satisfying one or more retention criteria, wherein the retention criteria is a defined branch of a directory tree, one or more defined directory services entries, or one or more defined attributes of the directory services entries.

12. A computer-implementable method for retrieving a portion of an original electronic mail message, wherein the portion is archived in secondary storage, the method comprising:
displaying a graphical user interface of an electronic mail message stub stored in a primary information storage device,
wherein the stub has replaced the original electronic mail message in the primary storage device, and,
wherein the graphical user interface comprises:
header fields of the original electronic mail message, including at least two of sender, recipient, subject, time, and date of the original electronic mail message;
a message indicating that the portion of the original electronic mail message has been archived; and,
a link to the portion of the original electronic mail message that is archived, wherein the link comprises an identifying path to the portion in a secondary storage device; and,
restoring the portion of the original electronic mail message from the secondary storage device to the primary storage device in response to a user selecting the link,
wherein the primary storage device and secondary storage device are coupled via a network.

13. The method of claim 12, wherein restoring the portion of the original electronic mail message further comprises:
accessing the portion of the original electronic mail message from the secondary storage device via the identifying path;
copying the portion of the original electronic mail message to the primary storage device; and,
removing, from the primary storage device, the link to the portion of the original electronic mail message.

14. The method of claim 12, wherein the portion of the original electronic mail message is an attachment to the original electronic mail message.

15. The method of claim 12, wherein the link is a Universal Naming Convention path that cannot be modified by a user.

16. The method of claim 12, wherein the graphical user interface is displayed in response to a user locating the electronic mail message stub via a full-text search function provided by an electronic mail server.

17. The method of claim 12, wherein the graphical user interface is displayed in response to a user selecting the electronic mail message stub from a backup system console browser.

18. The method of claim 12, wherein the primary storage device is browsable, and wherein the graphical user interface is displayed in response to a user manually selecting the electronic mail message stub from the browsable primary storage device.

19. A computer-implementable method for managing electronic mail data, the method comprising:
identifying a stub, in a first information storage device, that has replaced an archived electronic mail object that has been moved to a secondary storage device,
wherein the identified stub comprises an identifying path to the archived electronic mail object in the secondary storage device; and,
wherein the archived electronic mail object is an archived electronic mail message, an archived body of an electronic mail message, or an archived attachment to an electronic mail message,
wherein the first information storage device and the secondary storage device are coupled via a network;
retrieving a copy of the archived electronic mail object from the secondary storage device by providing the identifying path to a media agent;
storing the retrieved copy of the archived electronic mail object in the first information store;
deleting the identified stub from the first information store; and,
moving the stored copy of the archived electronic mail object from the first information storage device to a second information storage device.

* * * * *

UNITED STATES PATENT AND TRADEMARK OFFICE
CERTIFICATE OF CORRECTION

PATENT NO.        : 8,055,627 B2                                         Page 1 of 1
APPLICATION NO.   : 12/252897
DATED             : November 8, 2011
INVENTOR(S)       : Anand Prahlad et al.

It is certified that error appears in the above-identified patent and that said Letters Patent is hereby corrected as shown below:

On Sheet 3 of 5, Reference Numeral 195, Figure 3, line 1, delete "retreive" and insert -- retrieve --, therefor.

On Sheet 4 of 5, Reference Numeral 245, Figure 4, line 1, delete "retreive" and insert -- retrieve --, therefor.

In column 4, line 62, delete "though" and insert -- through --, therefor.

In column 11, line 47, in Claim 1, delete "indictor" and insert -- indicator --, therefor.

Signed and Sealed this
Seventeenth Day of January, 2012

David J. Kappos
*Director of the United States Patent and Trademark Office*